United States Patent
Nakatsuka et al.

(10) Patent No.: US 11,920,385 B2
(45) Date of Patent: Mar. 5, 2024

(54) SENSOR ASSEMBLY AND DOOR LOCK DEVICE

(71) Applicant: MITSUI KINZOKU ACT CORPORATION, Yokohama (JP)

(72) Inventors: Fuyuki Nakatsuka, Yokohama (JP); Shuntaro Kimura, Yokohama (JP); Nao Mizumoto, Yokohama (JP)

(73) Assignee: Mitsui Kinzoku Act Corporation (JP)

( * ) Notice: Subject to any disclaimer, the term of this patent is extended or adjusted under 35 U.S.C. 154(b) by 404 days.

(21) Appl. No.: 17/294,274

(22) PCT Filed: Sep. 18, 2019

(86) PCT No.: PCT/JP2019/036606
§ 371 (c)(1),
(2) Date: May 14, 2021

(87) PCT Pub. No.: WO2020/105264
PCT Pub. Date: May 28, 2020

(65) Prior Publication Data
US 2022/0010600 A1 Jan. 13, 2022

(30) Foreign Application Priority Data
Nov. 19, 2018 (JP) .................... 2018-216785

(51) Int. Cl.
*E05B 81/66* (2014.01)
*B60J 5/10* (2006.01)
(Continued)

(52) U.S. Cl.
CPC .............. *E05B 81/66* (2013.01); *B60J 5/10* (2013.01); *E05B 77/34* (2013.01); *E05B 81/14* (2013.01); *E05B 85/02* (2013.01); *E05B 85/24* (2013.01)

(58) Field of Classification Search
CPC .......... E05B 81/00; E05B 81/54; E05B 81/64; E05B 81/66; E05B 81/68; E05B 81/12;
(Continued)

(56) References Cited

U.S. PATENT DOCUMENTS

2002/0006749 A1* 1/2002 Yamamoto ............. H05K 3/284
439/620.21
2004/0023439 A1* 2/2004 Kimino ............... H01L 21/6715
438/126

(Continued)

FOREIGN PATENT DOCUMENTS

CN 101599336 A 12/2009
JP 2002-033438 A 1/2002
(Continued)

OTHER PUBLICATIONS

International Searching Authority, "International Search Report," issued in connection with International Patent Application No. PCT/JP2019/036606, dated Nov. 26, 2019.
(Continued)

*Primary Examiner* — Nathan Cumar
(74) *Attorney, Agent, or Firm* — Foley & Lardner LLP

(57) ABSTRACT

The present invention is a sensor assembly that is used in a door lock device provided with a latch, a ratchet, a drive unit that drives the ratchet and releases the engagement of the ratchet and the latch, and a case that accommodates the drive unit, the sensor assembly being provided with a sensor that detects the action of the ratchet when the engagement of the ratchet and the latch is released, wherein the sensor assembly is provided with: a connector that holds connection conductors electrically connected to the sensor, and is attached to the case; a sensor base that holds the sensor; a plurality of electric wires that connect the plurality of connection conductors and a plurality of terminal portions of the sensor; and a waterproofing material that comprises a
(Continued)

photo-curing resin for covering, along with the sensor base, connecting portions of the terminal portions and the electric wires.

6 Claims, 14 Drawing Sheets

(51) Int. Cl.
*E05B 77/34* (2014.01)
*E05B 81/14* (2014.01)
*E05B 85/02* (2014.01)
*E05B 85/24* (2014.01)

(58) Field of Classification Search
CPC .......... E05B 81/14; E05B 81/15; E05B 77/00; E05B 77/34; E05B 85/00; E05B 85/02; E05B 85/20; E05B 85/24; E05B 85/243; E05B 85/245; E05B 85/247; E05B 85/26; E05B 85/28; B60J 5/00; B60J 5/10; B60J 5/04; B60J 5/101; B60J 5/102
USPC .......................................................... 70/237
See application file for complete search history.

(56) References Cited

U.S. PATENT DOCUMENTS

| | | | |
|---|---|---|---|
| 2009/0278640 A1 | 11/2009 | Oh et al. | |
| 2011/0078954 A1* | 4/2011 | Ikezumi | E05B 83/40 49/70 |
| 2012/0193926 A1* | 8/2012 | Watanabe | E05B 81/66 292/195 |
| 2019/0379144 A1 | 12/2019 | Nomura et al. | |

FOREIGN PATENT DOCUMENTS

| | | |
|---|---|---|
| JP | 2004-319288 A | 11/2004 |
| JP | 2006-165017 A | 6/2006 |
| JP | 2012-158866 A | 8/2012 |
| JP | 2013-083086 A | 5/2013 |
| JP | 2018-120693 A | 8/2018 |

OTHER PUBLICATIONS

International Searching Authority, "Written Opinion," issued in connection with International Patent Application No. PCT/JP2019/036606, dated Nov. 26, 2019.

* cited by examiner

[FIG. 1]
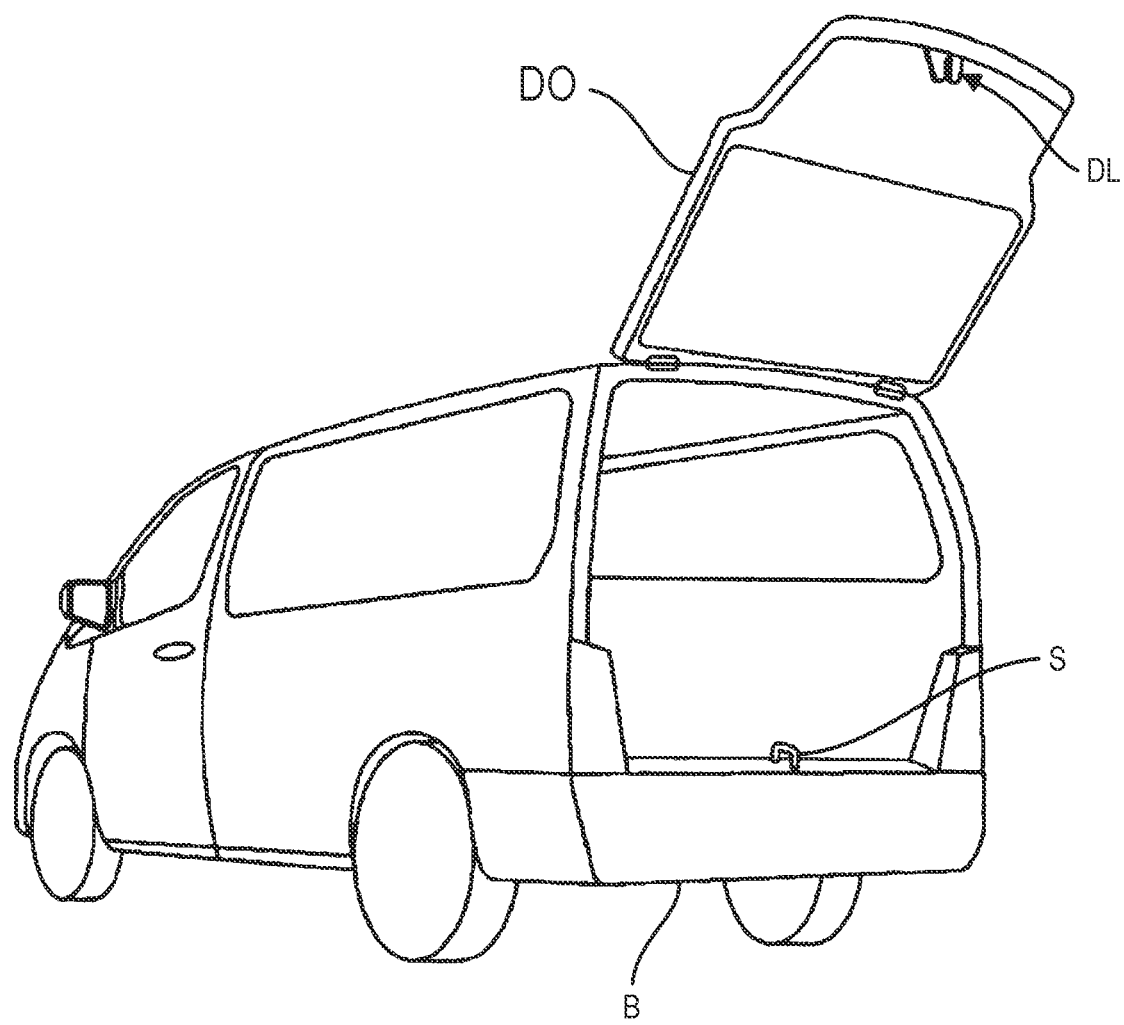

[FIG. 2]
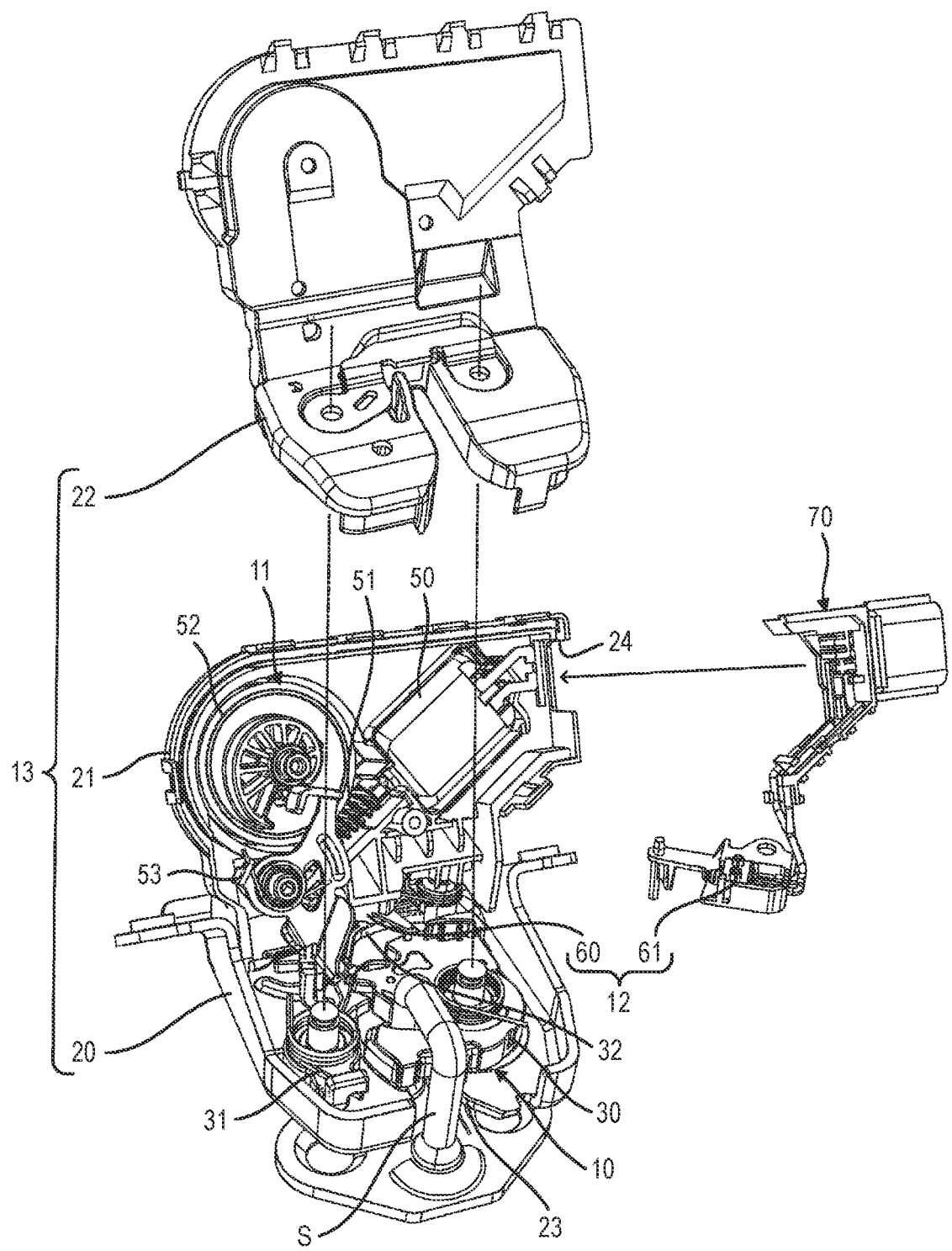

[FIG. 3]
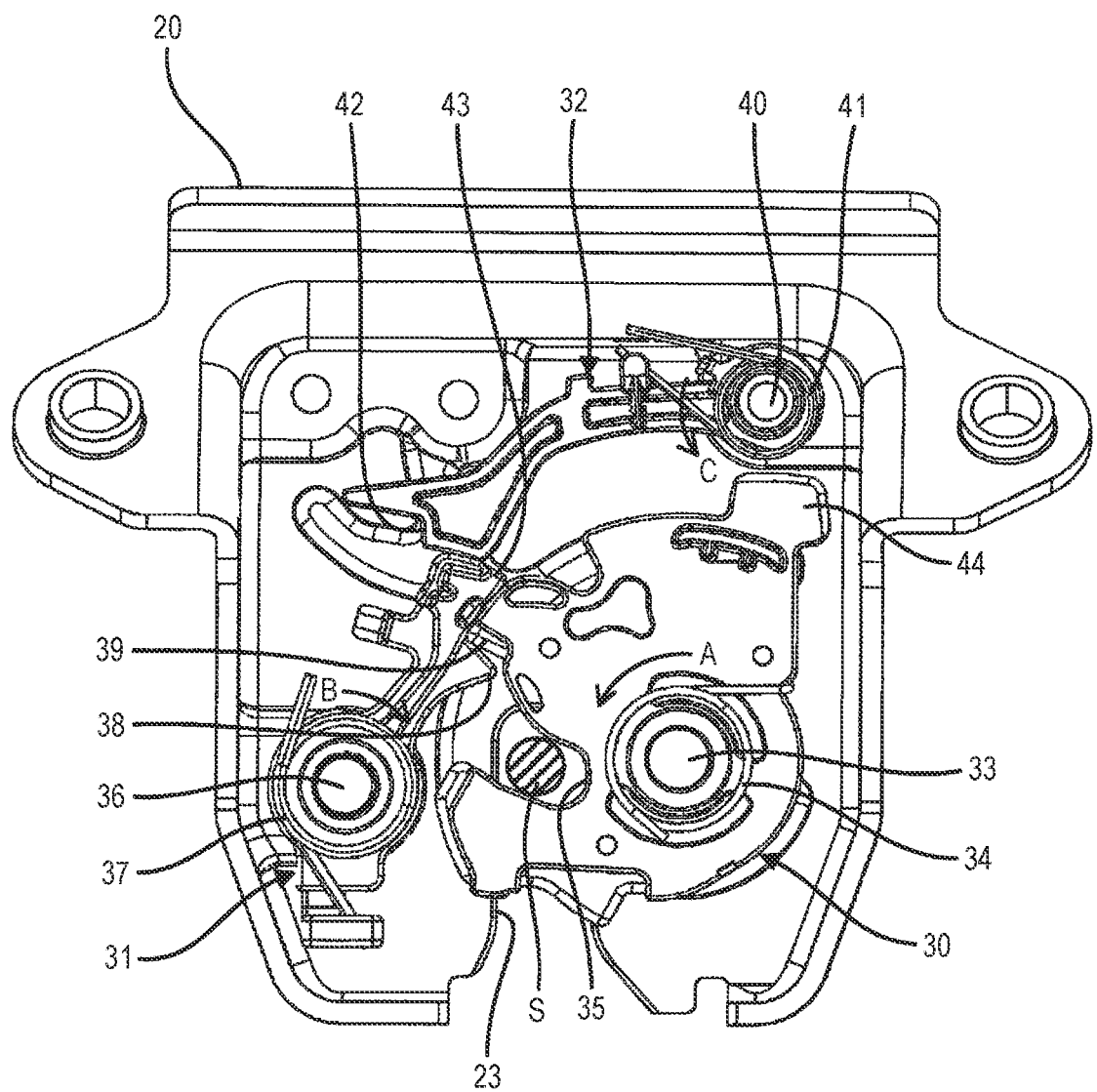

[FIG. 4]
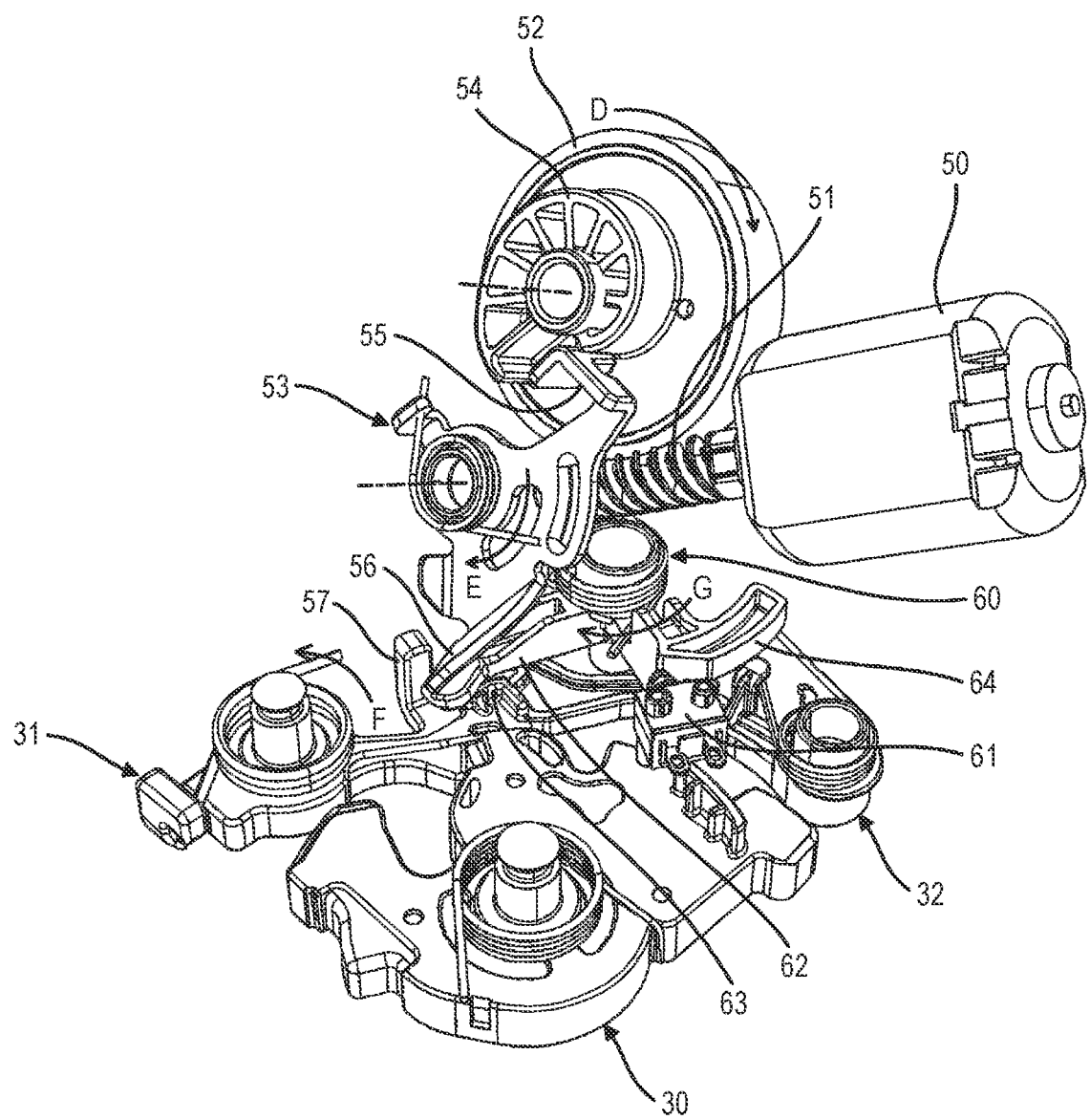

[FIG. 5]
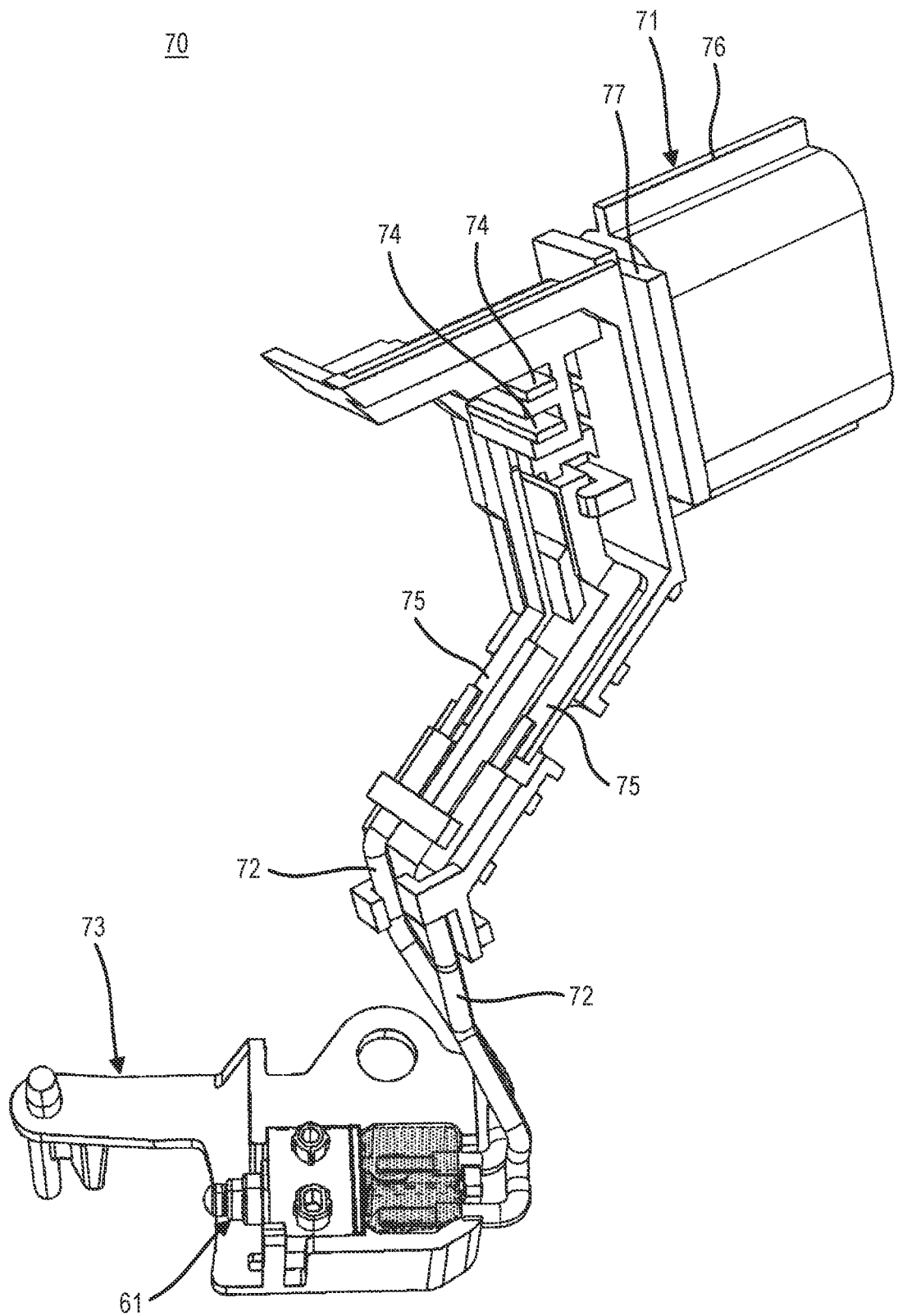

[FIG. 6]
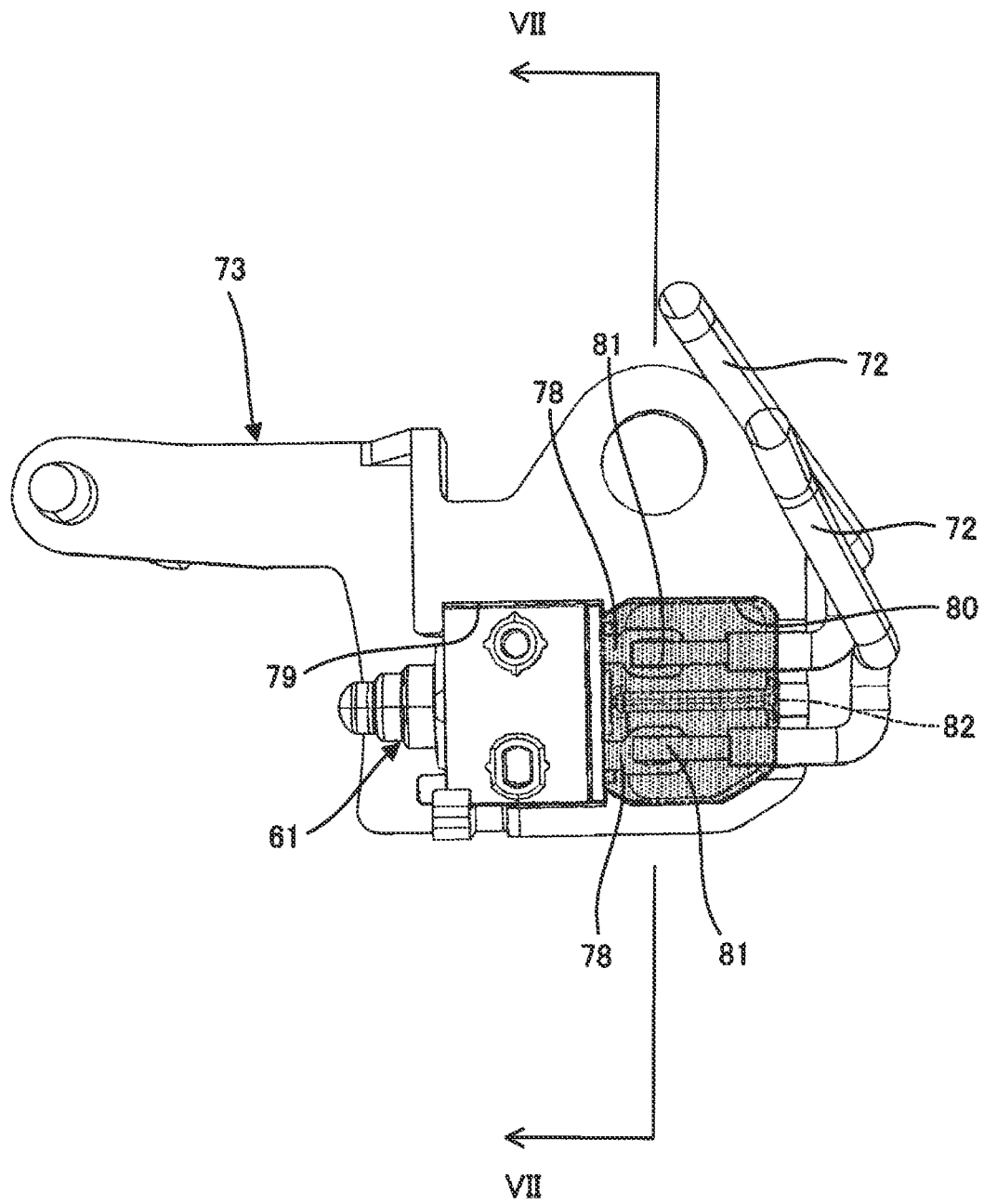

[FIG. 7]
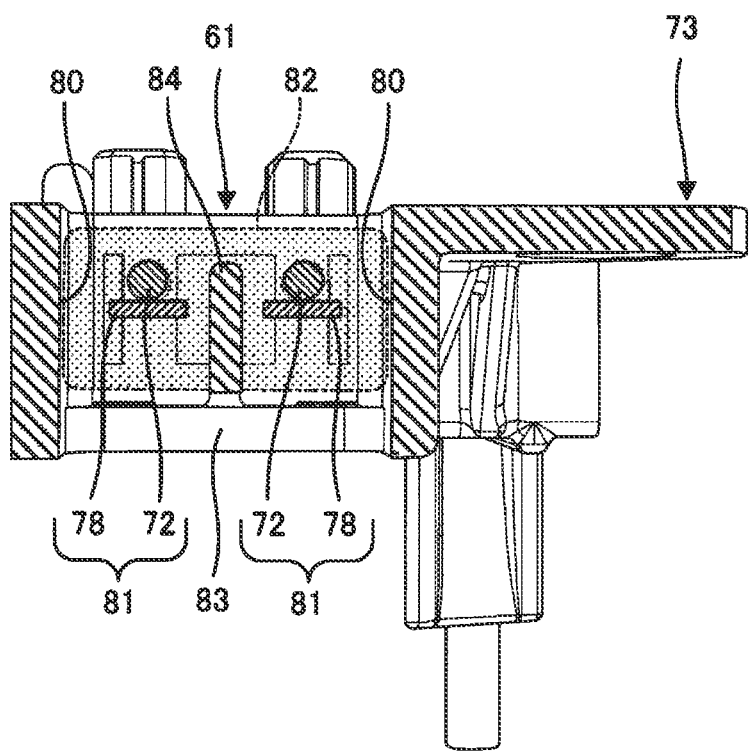

[FIG. 8]
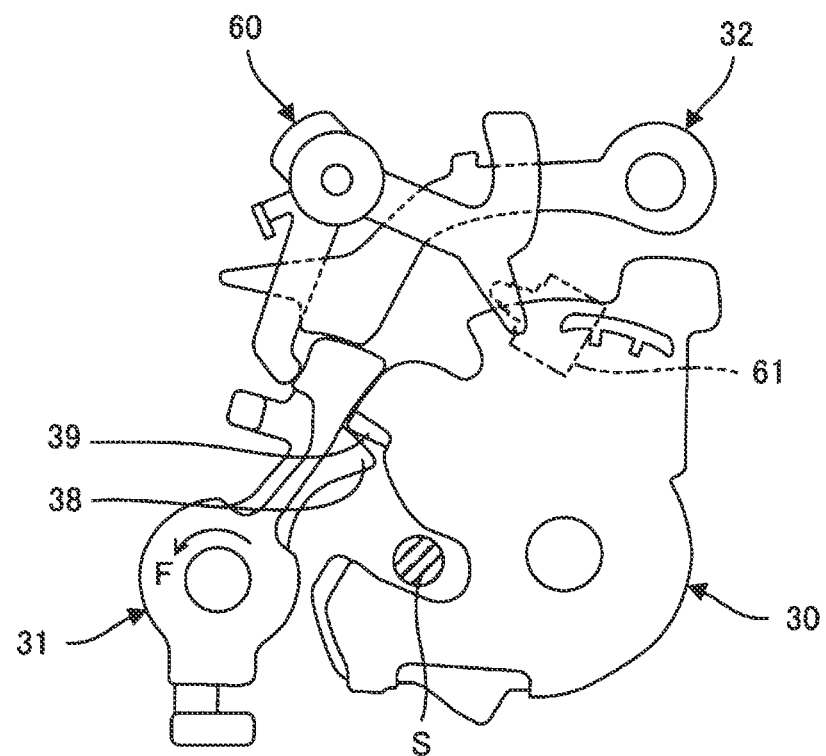

[FIG. 9]
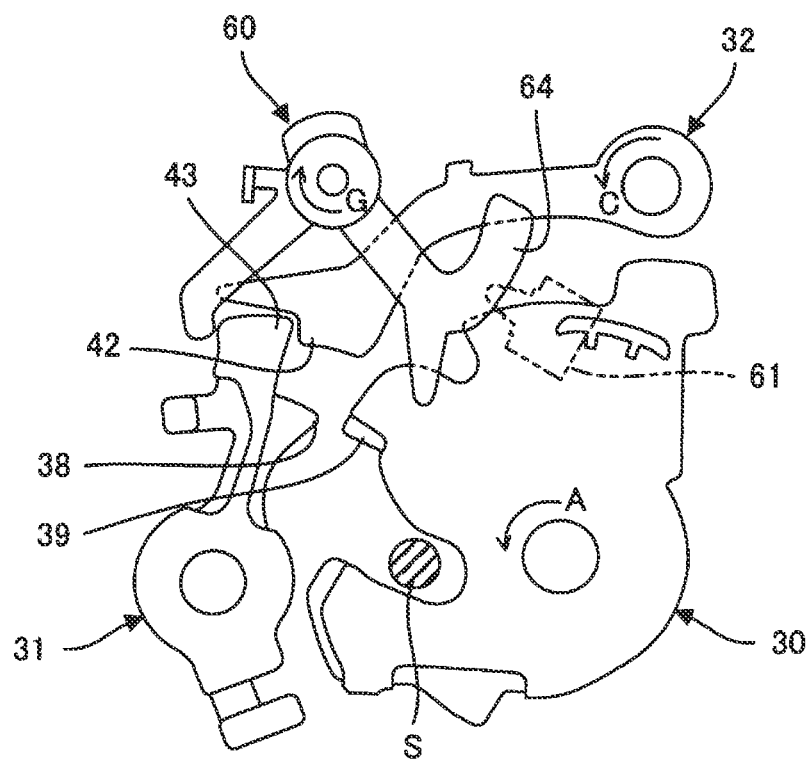

[FIG. 10]
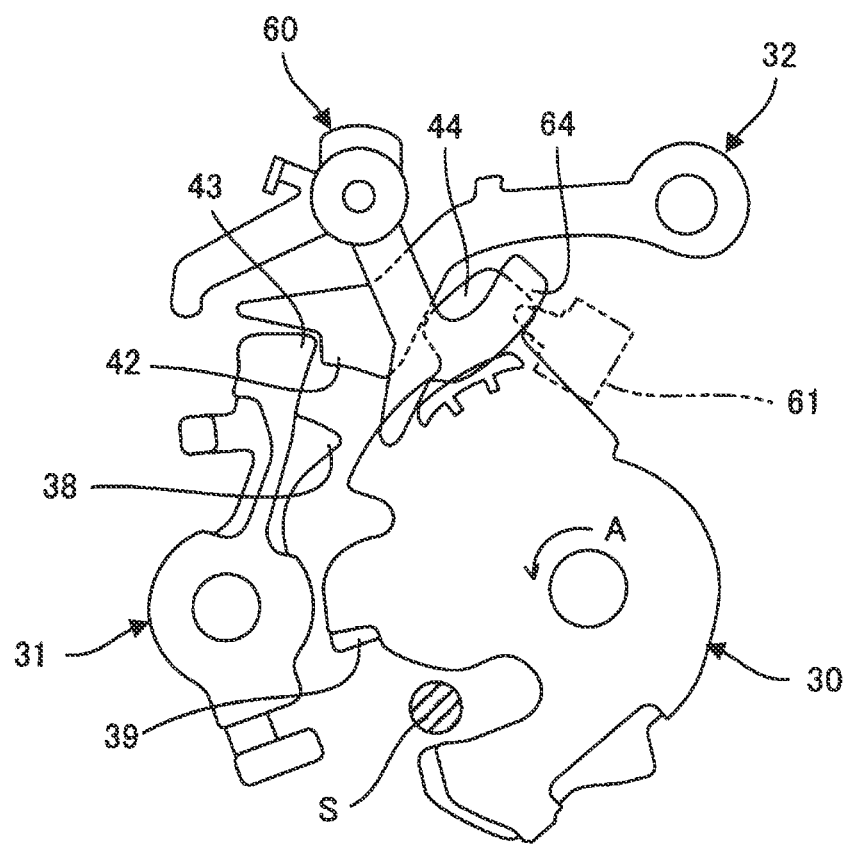

[FIG.11]
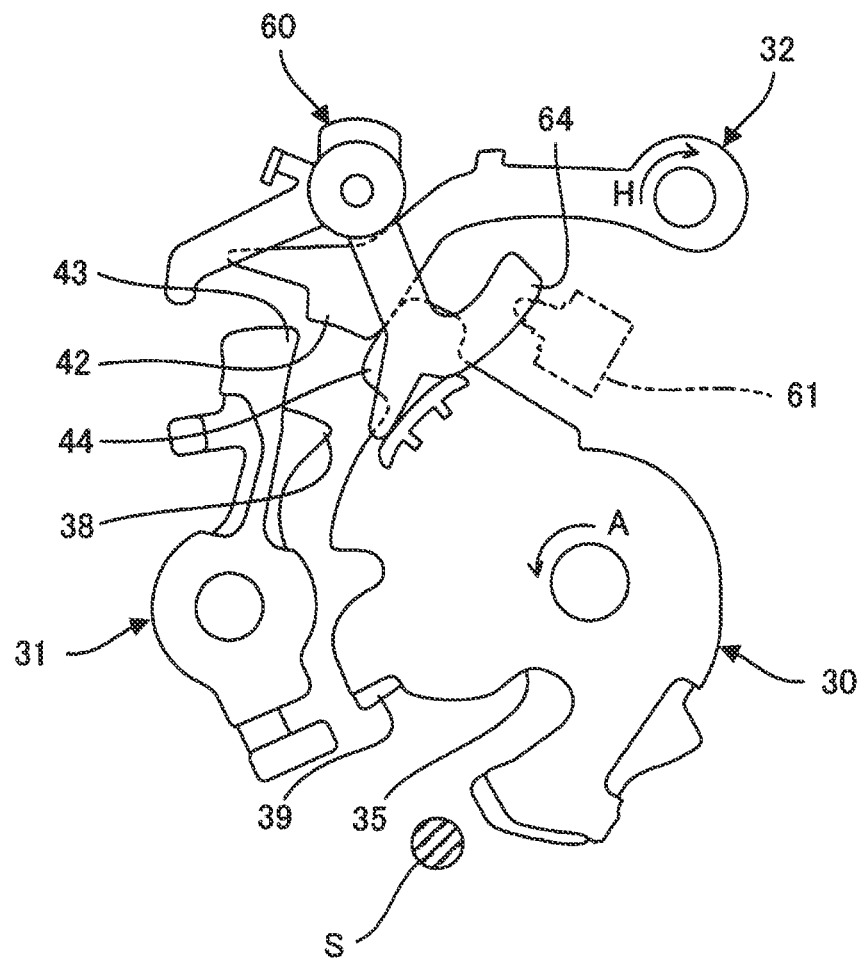

[FIG. 12]
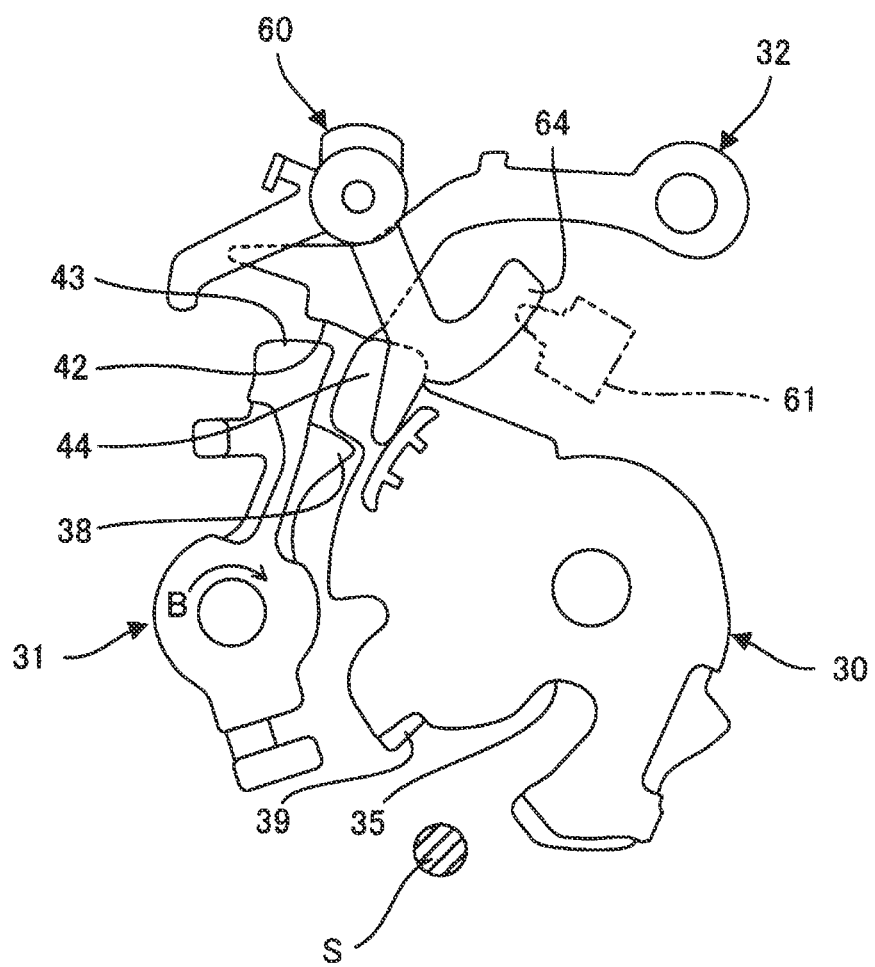

[FIG. 13]
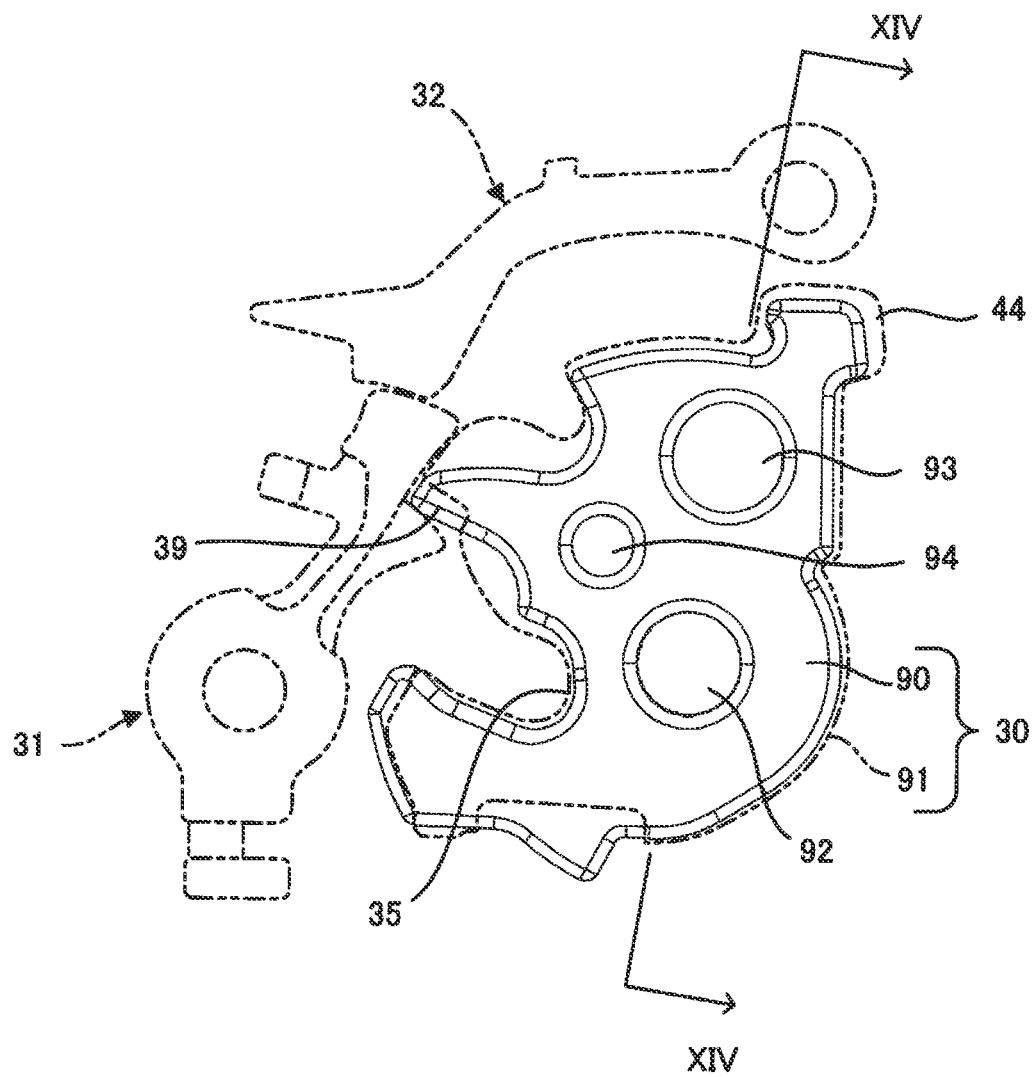

[FIG. 14]
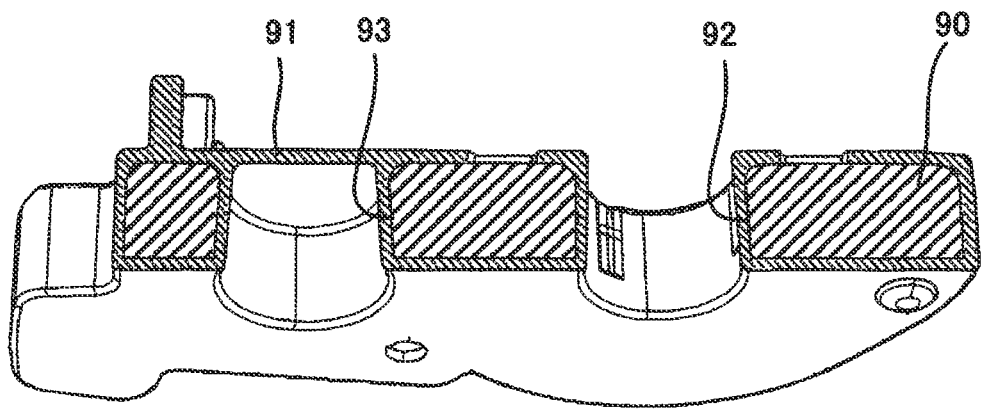

SENSOR ASSEMBLY AND DOOR LOCK DEVICE

CROSS-REFERENCE TO RELATED APPLICATIONS

The present application claims priority under 37 U.S.C. § 371 to International Patent Application No. PCT/JP2019/036606, filed Sep. 18, 2019, which claims priority to and the benefit of Japanese Patent Application No. 2018-216785, filed on Nov. 19, 2018. The contents of these applications are hereby incorporated by reference in their entireties.

TECHNICAL FIELD

The present invention relates to a sensor assembly that is incorporated into a door lock device configured to hold a vehicle door in a closed state and a door lock device.

BACKGROUND ART

A door lock device configured to hold a vehicle door in a closed state includes a latch configured to engage with a striker provided on a vehicle body, a ratchet configured to engage with the latch engaging with the striker so as to hold the door in the closed state, and a drive unit configured to rotate the ratchet in a direction in which the ratchet is disengaged from the latch, and is provided on the vehicle door. Then, a sensor configured to detect an operation of the latch or the ratchet may be provided in the door lock device from time to time (for example, refer to PTL 1).

Electric wires are connected to terminal portions of the sensor, and the terminal portions and the electric wires are joined together through soldering or resistance welding. When water adheres to a connecting portion where the terminal portions and the electric wires are connected together, a short circuit is possibly generated between the terminal portions. The connecting portion needs to be protected from water attempting to adhere thereto since rain water or the like can intrude into the door lock device. In the door lock device described in PTL 1, a draining portion for draining is provided in a main body of the door lock device drain where the sensor is disposed, and the terminal portions of the sensor are provided above the draining portion.

CITATION LIST

Patent Literature

PTL 1: JP-A-2012-158866

SUMMARY OF INVENTION

Technical Problem

With the door lock device described in PTL 1, water is prevented from staying below the terminal portions of the sensor, and the draining configuration provided is effective in preventing the terminal portions from being wet by water intruding into the door lock device due to normal rain or the like. However, the terminal portions of the sensor are exposed, and hence, there is still room for improvement in ensuring the reliability of the door lock device against water gushing into the door lock device due to driving rain or when the vehicle is washed to be cleaned with highly pressurized water.

The invention has been made in view of the situations described above, and an object thereof is to enhance the waterproofness of a connecting portion between terminal portions of a sensor incorporated in a door lock device and electric wires without impairing the productivity of the door lock device.

Solution to Problem

A sensor assembly according to one illustrative aspect of the invention is used for a door lock device, the door lock device including a latch configured to engage with a striker provided on a vehicle body, a ratchet configured to engage with the latch that is in engagement with the striker, a drive unit configured to drive the ratchet to release an engagement of the ratchet with the latch, and a case accommodating the drive unit, the sensor assembly including a sensor configured to detect an operation of the latch or the ratchet, in which the sensor assembly includes: a connector configured to hold a plurality of connection conductors and assembled to the case, the connection conductors being connected directly or by way of a plurality of electric wires with a plurality of terminal portions of the sensor; a sensor base configured to hold the sensor; and a waterproofing material made from a light curing resin and configured to cover connecting portions together with the sensor base, the connecting portions being between the terminal portions of the sensor and the connection conductors or the electric wires.

Further, a door lock device according to one illustrative aspect of the invention is assembled with the sensor assembly.

Advantageous Effects of Invention

According to the invention, it is possible to enhance the waterproofness of the connecting portion between the terminal portions of the sensor incorporated in the door lock device and the electric wires without impairing the productivity of the door lock device.

BRIEF DESCRIPTION OF DRAWINGS

FIG. 1 is a perspective view of an example of a vehicle including a door lock device for explaining an embodiment of the invention.

FIG. 2 is an exploded perspective view of the door lock device for explaining the embodiment of the invention.

FIG. 3 is a plan view of a latch mechanism of the door lock device shown in FIG. 2.

FIG. 4 is a perspective view of a drive unit and a detection portion of the door lock device shown in FIG. 2.

FIG. 5 is a perspective view of a sensor assembly of the door lock device shown in FIG. 2.

FIG. 6 is a plan view showing a main portion of the sensor assembly shown in FIG. 5 in an enlarged fashion.

FIG. 7 is a cross-sectional view taken along a line VII-VII shown in FIG. 6.

FIG. 8 is a schematic drawing showing an operation of the door lock device shown in FIG. 2.

FIG. 9 is a schematic drawing showing an operation of the door lock device shown in FIG. 2.

FIG. 10 is a schematic drawing showing an operation of the door lock device shown in FIG. 2.

FIG. 11 is a schematic drawing showing an operation of the door lock device shown in FIG. 2.

FIG. 12 is a schematic drawing showing an operation of the door lock device shown in FIG. 2.

FIG. 13 is a plan view of a core plate of a latch shown in FIG. 3.

FIG. 14 is a cross-sectional view taken along a line XIV-XIV shown in FIG. 13.

DESCRIPTION OF EMBODIMENTS

FIG. 1 shows an example of a vehicle including a door lock device according to an embodiment of the invention.

A door lock device DL is configured to hold a vehicle door DO in a closed state by locking a striker S provided on a vehicle body B. In the example shown in FIG. 1, the vehicle door DO is a hinged lifting back access door revolved in a vertical direction relative to the vehicle body B. However, the door lock device DL may be applied to a hinged revolving side door revolved in a transverse direction relative to the vehicle body B or a sliding side door sliding in a front-rear direction along the vehicle body B.

FIG. 2 is an exploded perspective view of the door lock device DL.

The door lock device DL includes a latch mechanism 10 configured to lock the striker S, a drive unit 11 configured to drive the latch mechanism 10, a detection portion 12 configured to detect an operation of the latch mechanism 10 driven by the drive unit 11, and a housing 13 configured to house the latch mechanism 10, the drive unit 11, and the detection portion 12.

The housing 13 includes a metallic base 20 that is fixed to the vehicle door DO, a case 21 assembled to the base 20, and a cover 22 assembled to the base 20 and the case 21 while providing an space between the base 20 and the case 21. The case 21 and the cover 22 are made of resin, for example. The base 20 includes a striker entering groove 23 that the striker S enters as the vehicle door DO is closed, and the latch mechanism 10 that locks the striker S is placed on the base 20. The drive unit 11 that drives the latch mechanism 10 is placed on the case 21.

FIG. 3 shows the latch mechanism 10.

The latch mechanism 10 includes a latch 30 configured to engage with the striker S, a ratchet 31 configured to engage with the latch 30, and a memory lever 32 configured to engage with the ratchet 31.

The latch 30 can rotate between a latching position where the latch 30 engages with the striker S and an unlatching position. A latch shaft 33, configured to support the latch 30 rotatably, is provided on a side of the striker entering groove 23. The latch 30 is biased in a direction indicated by an arrow A from the latching position towards the unlatching portion by a torsion spring 34.

The latch 30 includes a striker engaging groove 35. With the latch 30 staying in the unlatching position, an entrance of the striker engaging groove 35 is disposed so as to coincide vertically with an entrance of the striker entering groove 23, whereby the striker S can freely enter both the striker entering groove 23 and the striker engaging groove 35 or can freely leave from both the grooves. On the other hand, with the latch 30 staying in the latching position, the entrance of the striker engaging groove 35 is disposed so as to be dislocated from the entrance of the striker entering groove 23, whereby the striker entering groove 23 intersects the striker engaging groove 35. This prevents the striker S, which is now staying in the striker entering groove 23 and the striker engaging groove 35, from leaving from both the grooves, whereby the latch 30 engages with the striker S.

The latchet 31 can rotate between a locking position where the latchet 31 engages with the latch 30 and an unlocking position. A ratchet shaft 36, configured to support the ratchet 31 rotatably, is provided on an opposite side of the striker entering groove 23 to the side where the latch shaft 33 is provided. The ratchet 31 is biased in a direction indicated by an arrow B from the unlocking position towards the locking position by a torsion spring 37.

The ratchet 31 includes a locking portion 38. The ratchet 31 biased towards the locking position brings the locking portion 38 into sliding contact with an outer circumference of the latch 30. The locking portion 38 engages with an engaging portion 39 provided on an outer circumference of the latch 30 when the latch 30 is rotated from the unlatching position in an opposite direction to the direction indicated by the arrow A to be disposed in the latching position. The latch 30 is prevented from rotating in the direction indicated by the arrow A from the latching position towards the unlatching position by the resulting engagement of the locking portion 38 with the engaging portion 39, whereby the latch 30 is held in the latching position. As a result, the engagement of the latch 30 with the striker S, whereby the vehicle door DO is held in the closed state.

The memory lever 32 can rotate between a locking position where the memory lever 32 locks the ratchet 31 and an unlocking position. A memory lever shaft 40, configured to support the memory lever 32 rotatably, is provided on an opposite side of a straight line L that connects the latch shaft 33 with the ratchet shaft 36 to a side where the entrance of the striker entering groove 23 lies, and the memory lever 32 is disposed in a position lying closer to a deeper end of the striker entering groove 23 than the latch 30 and the ratchet 31 and on the same plane as a plane on which the latch 30 and the latchet 31 are disposed. The memory lever 32 is biased in a direction indicated by an arrow C from the unlocking position towards the locking position by a torsion spring 41.

The memory lever 32 includes a locking portion 42, and since the memory lever 32 is biased towards the locking position, the locking portion 42 is brought into sliding contact with an outer circumference of the ratchet 31. The locking portion 42 engages with an engaging portion 43 provided on the outer circumference of the ratchet 31 when the ratchet 31 is rotated from the locking position in an opposite direction to the direction indicted by the arrow B to be disposed in the unlocking position. The ratchet 31 is prevented from rotating in the direction indicated by the arrow B from the unlocking position towards the locking position, whereby the ratchet 31 is held in the unlocking position by the resulting engagement of the locking portion 42 with the engaging portion 43.

The locking of the ratchet 31 by the memory lever 32 is unlocked by the latch 30. The latch 30 includes an unlocking portion 44 configured to engage with the memory lever 32. As the latch 30 is rotated in the direction indicated by the arrow A from the latching position to be moved to the unlatching position, the unlocking portion 44 comes into abutment with the memory lever 32 to press against the memory lever 32. This causes the memory lever 32 to rotate from the locking position in an opposite direction to a direction indicated by an arrow C to be disposed in the unlocking position. Then, the engagement of the locking portion 42 with the engaging portion 43 is released as a result of the memory lever 32 being disposed in the unlocking position, whereby the ratchet 31 is allowed to rotate in the direction indicated by the arrow B from the unlocking position towards the locking position.

FIG. 4 shows the drive unit 11 for driving the latch mechanism 10.

The drive unit 11 includes a motor 50 configuring a drive source, a worm wheel 52 configured to mesh with a worm 51 attached to an output shaft of the motor 50, and an opening lever 53 configured to be driven by the worm wheel 52.

The motor 50 is controlled by a control unit, not shown. The control unit controls the motor 50 to operate based on an operation of a door lock release button provided in the vicinity of a driver's seat, for example. The worm wheel 52 is rotated once whole rotation in a direction indicated by an arrow D by the motor 50. The worm wheel 52 includes a cam 54, and the opening lever 53 includes a cam follower 55. The cam 54 is rotated together with the worm wheel 52, and the cam follower 55 is pressed against by the cam 54, whereby the opening lever 53 is rotated in a direction indicated by an arrow E.

The opening lever 53 includes a pressing portion 56, and the pressing portion 56 engages with the ratchet 31 of the latch mechanism 10. The ratchet 31 includes a pressed portion 57. The pressing portion 56 comes into engagement with the pressed portion 57 when the opening lever 53 is rotated in the direction indicated by the arrow E, and the pressed portion 57 is pressed against by the pressing portion 56. This causes the ratchet 31 to rotate in a direction indicated by an arrow F from the locking position to the unlocking position.

Next, the detection portion 12 configured to detect an operation of the latch mechanism 10 will be described.

The detection portion 12 includes a detection lever 60 and a sensor 61.

The detection lever 60 is assembled to the base 20 rotatably. The detection lever 60 includes a pressed portion 62, and the pressed portion 62 engages with the ratchet 31 of the latch mechanism 10. The ratchet 31 includes a pressing portion 63. The pressed portion 62 and the pressing portion 63 are brought into engagement with each other when the ratchet 31 is rotated in the direction indicated by the arrow F from the locking position to the unlocking portion, and the pressed portion 62 is pressed against by the pressing portion 63. This causes the detection lever 60 to rotate in a direction indicated by an arrow G.

Additionally, the detection lever 60 includes a sensor engaging portion 64. The sensor engaging portion 64 has an arc-like shape that is centered at a rotational axis of the detection lever 60. The sensor 61 is a tact switch, and a switch button thereof is placed on a trajectory of the sensor engaging portion 64. The sensor engaging portion 64 engages with the switch button of the sensor 61 when the detection lever 60 is rotated in the direction indicated by the arrow G, whereby the switch button is depressed by the sensor engaging portion 64. Thereby, the sensor 61 is switched on. The sensor 61 is not limited to the tact switch and hence may be an optical switch such as a photo interrupter. A detection signal that is outputted by the sensor 61 when it is switched on is inputted into the control unit, not shown, and the control unit detects an operation of the latch mechanism 10 based on the detection signal inputted thereinto and illuminates, for example, an indicator lamp on an instrument panel, a room lamp, or the like.

The sensor 61 makes up a sensor assembly 70 (refer to FIG. 2) together with a connector providing a connection between the door lock device DL and the control unit and the like, and is assembled to the door lock device DL in the form of the sensor assembly 70. This realizes an improvement in production efficiency of the door lock device DL.

FIGS. 5 to 7 show the sensor assembly 70.

The sensor assembly 70 includes a connector 71, a plurality of electric wires 72, and a sensor base 73.

The connector 71 includes two first connection conductors 74 that are electrically connected with the motor 50, two second connection conductors 75 that are electrically connected with the sensor 61, and a connector housing 76 configured to hold the first connection conductors 74 and the second connection conductors 75. The connector housing 76 is formed of an insulating resin material. The first connection conductors 74 and the second connection conductors 75 are fitted in the connector housing 76. A rectangular cut-out portion 24 is provided in the case 21 of the door lock device DL, and an attaching portion 77 is provided on the connector housing 76. The attaching portion 77 is pushed into the cut-out portion 24, whereby the connector 71 is assembled to the case 21.

In an example shown in FIG. 5, the second connection conductor 75 is connected to the terminal portion 78 of the sensor 61 by way of the electric wire 72. Although the second connection conductor 75 and the electric wire 72, and the electric wire 72 and the terminal portion 78 are connected together through resistance welding, the connection method is not limited to the resistance welding, and hence, they may be connected together through soldering. Incidentally, the second connection conductor 75 may be connected directly with the terminal portion 78 of the sensor 61 and, even in the case where the second connection conductor 75 is connected directly with the terminal portion 78, the second connection conductor 75 may be connected through resistance welding, soldering or the like.

The sensor base 73 holds the sensor 61. The sensor base 73 is assembled to the cover 22 (refer to FIG. 2) that makes up the housing 13 of the door lock device DL and is installed together with the latch mechanism 10 (the latch 30, the ratchet 31, and the memory lever 32) in an accommodation space defined between the base 20 and the cover 22. The sensor 61 held by the sensor base 73 is placed on the trajectory of the sensor engaging portion 64 of the detection lever 60 assembled to the base 20.

As shown in FIGS. 6 and 7, the sensor base 73 is formed of an insulating resin material and includes a first recessed portion 79 configured to fittingly hold the sensor 61, and second recessed portions 80 that communicate with the first recessed portion 79. Connecting portions 81, where the electric wires 72 are connected with the corresponding terminal portions 78 of the sensor 61, are accommodated individually in the second recessed portions 80. Then, the second recessed portions 80 accommodating the connecting portions 81 are filled with a waterproofing material 82 made up of a photo-curable resin material, whereby the connecting portions 81 are covered with the sensor base 73 and the waterproofing material 82.

A through hole 83 is formed in a bottom wall of the second recessed portion 80 in such a manner as to face the corresponding connecting portion 81 accommodated in the second recessed portion 80. Of a pair of electrodes for use in resistance welding the connecting portions 81, one electrode is pressed against the connecting portion 81 through the through hole 83. Additionally, the through hole 83 can also be used as a light irradiation window for passing through curing light to irradiate the photo-curable resin material making up the waterproofing material 82 with the curing light. In filling the second recessed portions 80 with the photo-curable resin material, the through holes 83 are closed by a jig, not shown. In the case where the jig is transparent or translucent to the curing light, the photo-curable resin material can also be irradiated with the curing light through the through hole 83 from a rear side of the sensor base 73, thereby making it possible to reduce a curing time.

An ultraviolet curing resin material is preferably adopted as the photo-curable resin material making up the waterproofing material 82 from the viewpoints of suppressing a generation of cracking under a low-temperature environment, a generation of bubbles under a high-temperature environment, and a reduction in insulating properties attributed by water absorbed. Then, from the viewpoint of enhancing the productivity, a curing time for the ultraviolet curing resin material is preferably 3 seconds or longer to 20 seconds or shorter and is more preferably 5 seconds or longer to 15 seconds or shorter under ultraviolet irradiation conditions at a temperature of 25° C., an illuminance of 1000 mW/cm$^2$, and an accumulated light quantity of 3000 to 20000 mJ/cm$^2$.

The accommodation space defined between the base 20 and the cover 22 for accommodating the latch mechanism 10 is opened at least at a portion coinciding with the entrance of the striker entering groove 23, and hence, water may intrude into the accommodation space at the time of driving rain or washing the vehicle with highly pressurized water. In the event that water intrudes into the accommodation space defined between the base 20 and the cover 22, the sensor 61 installed in the accommodation space is exposed to the water that intrudes into the accommodation space. However, since the connecting portions 81 are covered with the sensor base 73 and the waterproofing material 82, a short circuit is prevented from occurring between the terminal portions of the sensor 61.

In the example shown in FIGS. 6 and 7, the two second recessed portions 80 are provided for the two connecting portions 81, and the connecting portions 81 are accommodated individually in the separate second recessed portions 80. In other words, a bulkhead 84 is provided between the two connecting portions 81. This ensures further the insulation between the terminal portions of the sensor 61.

FIGS. 8 to 12 show operations of the door lock device DL.

In FIG. 8, the latch 30 is located at the latching position, and the ratchet 31 is located at the locking position. Then, the engaging portion 39 of the latch 30 is in engagement with the locking portion 38 of the ratchet 31, whereby the latch 30 is held in engagement with the striker S, and the vehicle door DO is held in the closed state (securely closed state). Additionally, the memory lever 32 is staying in the unlocking position. The ratchet 31 is caused to rotate in the direction indicated by the arrow F from the locking position towards the unlocking position by the drive unit 11.

As shown in FIG. 9, when the ratchet 31 is located into the unlocking position, the engagement between the engaging portion 39 of the latch 30 and the locking portion 38 of the ratchet 31 is released, whereby the latch 30 is allowed to rotate in the direction indicated by the arrow A from the latching position towards the unlatching position. In addition, when the ratchet 31 is rotated into the unlocking position, the memory lever 32 is rotated in the direction indicated by the arrow C from the unlocking position to the locking position by means of biasing by the torsion spring 41 (refer to FIG. 3). When the memory lever 32 is rotated into the locking position, the locking portion 42 of the memory lever 32 comes into engagement with the engaging portion 43 of the ratchet 31, whereby the ratchet 31 is held in the unlocking position. This allows the ratchet 31 to be moved to the locking position by means of biasing by the torsion spring 37 (refer to FIG. 3), whereby the latch 30 is prevented from being brought into engagement with the ratchet 31 again before a door opening operation is performed.

In addition, when the ratchet 31 is rotated in the direction indicated by the arrow F from the locking position towards the unlocking position, the detection lever 60 is rotated in the direction indicated by the arrow G. Then, the switch button of the sensor 61 is pushed in by the sensor engaging portion 64 of the detection lever 60 as the detection lever 60 rotates, whereby the sensor 61 is switched on. A detection signal that is outputted by the sensor 61 that is switched on is inputted into the control unit, whereby an unlocking operation of the ratchet 31 is detected by the control unit.

As shown in FIG. 10, the latch 30 is rotated in the direction indicated by the arrow A from the latching position towards the unlatching position in response to the door opening operation. The unlocking portion 44 of the latch 30 is brought into abutment with the memory lever 32 as the latch 30 rotates and presses on the memory lever 32.

In this example, the detection lever 60 includes a second pressed portion 65 configured to engage with the latch 30. The latch 30 includes a pressing portion 66 configured to press on the second pressed portion 65 as the latch 30 rotates in the direction indicated by the arrow A from the latching position towards the unlatching position. The detection lever 60 is rotated further in the direction indicated by the arrow G when the latch 30 rotates in the direction indicated by the arrow A from the latching position to the unlatching position. As the detection lever 60 rotates, the switch button of the sensor 61 is pushed in by the sensor engaging portion 64 of the detection lever 60, whereby the sensor 61 is switched on. Thus, in place of the unlocking operation of the ratchet 31 shown in FIG. 9, it is also possible to detect the unlatching operation of the latch 30.

As shown in FIG. 11, the memory lever 32 is pressed against by the unlocking portion 44 of the latch 30 as the latch 30 rotates further in response to the door opening operation and is then rotated in a direction indicated by an arrow H from the locking position towards the unlocking position. The engaging portion 43 of the ratchet 31 is disengaged from the locking portion 42 of the memory lever 32 as a result of the memory lever 32 being disposed in the unlocking position, whereby the ratchet 31 can rotate in the direction indicated by the arrow B from the unlocking position towards the locking position. The striker S has already left from the striker engaging groove 35 of the latch 30 at a point in time when the memory lever 32 is disposed in the unlocking position.

Then, as shown in FIG. 12, the ratchet 31 is moved to the locking position by means of biasing by the torsion spring 37 (refer to FIG. 3). Thereafter, when the vehicle door DO is closed, the striker S enters the striker entering groove 23 and the striker engaging groove 35, and the latch 30 is pressed by the striker S to be moved to the latching position. Then, the ratchet 31 that has been moved to stay in the locking position engages with the latch 30 that has been moved to stay in the latching position, whereby the vehicle door DO is held in the closed state.

FIGS. 13 and 14 show the latch 30.

The latch 30 includes a core plate 90 and a covering member 91 configured to cover the core plate 90. The covering member 91 is made up of a resin material and is formed integrally with the core plate 90 through insert molding.

The core plate 90 forms a framework for the support portion that is supported on the latch shaft 33 on the latch 30, the striker engaging groove 35 that engages with the striker S, the engaging portion 39 that engages with the locking portion 38 of the ratchet 31, and the unlocking portion 44 that engages with the memory lever 32, and a shaft hole 92 is formed in the core plate 90 at a location corresponding to the support portion.

Here, the memory lever 32 is disposed in the position lying closer to the deeper end of the striker entering groove 23 than the latch 30 and the ratchet 31 and on the same plane as a plane on which the latch 30 and the latchet 31 are disposed. The core plate 90, which forms the framework for the unlocking portion 44 that engages with the memory lever 32, is extended longer towards the deeper end of the striker entering groove 23 than a case where there is provided no unlocking portion 44. In order to suppress an increase in weight of the core plate 90 in association with the extension of the core plate 90 described above, one or more through holes are formed in the core plate 90.

In the example shown in FIG. 13, the core plate 90 includes a first through hole 93 and a second through hole 94. The first through hole 93 and the second through hole 94 are provided between the shaft hole 92 configuring a rotational center of the latch 30 and the unlocking portion 44. The weight of the core plate 90 is reduced by the first through hole 93 and the second through hole 94. The number of through holes is not limited to two, and hence, three or more through holes may be provided.

As shown in FIG. 14, an inner circumferential surface of the shaft hole 92 in the core plate 90 is covered with the covering member 91, and an inner circumferential surface of the first through hole 93 is also covered with the covering member 91. However, one end of the first through hole 93 is closed by the covering member 91, while both ends of the shaft hole 92 through which the latch shaft 33 is inserted are opened. Although an illustration thereof is omitted here, an inner circumferential surface of the second through hole 94 is covered with the covering member 91, and one end of the second through hole 94 is closed by the covering member 91. As the one end of each of the first through hole 93 and the second through hole 94 is closed by the covering member 91, the latch shaft 33 can be inserted through only the shaft hole 92, whereby an erroneous assemblage of the latch shaft 33 is prevented.

Thus, as has been described heretofore, the door lock device disclosed in this description is the door lock device configured to hold the vehicle door in the closed state by locking the striker provided on the vehicle body and includes the latch configured to rotate between the latching position where the latch engages with the striker and the unlatching position, the ratchet configured to rotate between the locking position where the ratchet engages with the latch disposed in the latching position and the unlocking position, the drive unit configured to cause the ratchet to rotate from the locking position towards the unlocking position, and the memory lever configured to lock the ratchet disposed in the unlocking position in such a manner as to release the ratchet as required. The latch includes the unlocking portion configured to unlock the ratchet that is locked by the memory lever by working together with the memory lever according to the rotation from the latching position towards the unlatching position, and the core plate of the latch includes the one or more holes provided between the rotational center of the latch and the unlocking portion.

In addition, in the door lock device disclosed in this description, the latch includes the covering member formed integrally with the core plate using the resin material, and the one end of each of the through holes is closed by the covering member.

Additionally, the sensor assembly disclosed in this description is the sensor assembly used in the door lock device including the latch that engages with the striker provided on the vehicle body, the ratchet that engages with the latch that is in engagement with the striker, the drive unit that drives the ratchet to release the engagement of the ratchet with the latch, and the case that accommodates the drive unit and including the sensor configured to detect an operation of the latch or the ratchet. The sensor assembly includes the connector configured to hold the plurality of connection conductors that are connected directly or by way of the plurality of electric wires with the plurality of terminal portions of the sensor and assembled to the case, the sensor base configured to hold the sensor, and the waterproofing material configured to cover the connecting portions between the terminal portions of the sensor and the connection conductors or the electric wires together with the sensor base, the waterproofing material being made from a photocurable resin.

In the sensor assembly disclosed in this description, the door lock device includes the cover configured to accommodate the latch and the ratchet, and the sensor base is assembled to the cover.

Additionally, in the sensor assembly disclosed in the description, the connecting portions are resistance welded, and the sensor base includes the recessed portion accommodating the connecting portions and filled with the waterproofing material, the bottom wall of the recessed portion has the through hole facing the connecting portions.

Further, in the sensor assembly disclosed in the description, the recessed portion is provided for each of the connecting portions.

Furthermore, in the sensor assembly disclosed in the description, the waterproofing material is made up of the ultraviolet curing resin whose curing time is 3 seconds or longer to 20 seconds or shorter under irradiation conditions at the temperature of 25° C., the illuminance of 1000 mW/cm$^2$, and the accumulated light quantity of 3000 to 20000 mJ/cm$^2$.

The door lock device disclosed in this description is assembled with the sensor assembly.

INDUSTRIAL APPLICABILITY

The invention can be applied to a door lock device configured to hold a door of a vehicle such as a motor vehicle in a closed state.

Thus, while the embodiment of the invention has been described in detail, the embodiment only represents one example, and hence, the invention can be carried out in various modified forms without departing from the spirit and scope of the invention. This patent application is based on Japanese Patent Application (No. 2018-216785) filed on Nov. 19, 2018, the contents of which are incorporated herein by reference.

REFERENCE SIGNS LIST

10: latch mechanism
11: drive unit
12: detection portion
13: housing
20: base
21: case
22: cover
23: striker entering groove
24: cut-out portion 30: latch
31: ratchet
32: memory lever
33: latch shaft
35: striker engaging groove
36: ratchet shaft
38: locking portion
39: engaging portion
40: memory lever shaft
42: locking portion
43: engaging portion
44: unlocking portion
50: motor
51: worm
52: worm wheel
53: opening lever
54: cam
55: cam follower
56: pressing portion
57: pressed portion
60: detection lever
61: sensor
62: pressed portion
63: pressing portion
64: sensor engaging portion
70: sensor assembly
71: connector
72: electric wire
73: sensor base
74: first connection conductor
75: second connection conductor
76: connector housing
77: attaching portion
78: terminal portion
79: first recessed portion
80: second recessed portion
81: connecting portion
82: waterproofing material
83: through hole
84: bulkhead
90: core plate
91: covering member
92: shaft hole
93: first through hole
94: second through hole
B: vehicle body
DO: vehicle door
DL: door lock device
S: striker

The invention claimed is:

1. A sensor assembly used for a door lock device, the door lock device comprising a latch configured to engage with a striker provided on a vehicle body, a ratchet configured to engage with the latch that is in engagement with the striker, a drive mechanism configured to drive the ratchet to release an engagement of the ratchet with the latch, and a case accommodating the drive mechanism, the sensor assembly comprising a sensor configured to detect an operation of the latch or the ratchet;
a connector configured to hold a plurality of connection conductors and assembled to the case, the connection conductors being connected directly or by way of a plurality of electric wires with a plurality of terminal portions of the sensor;
a sensor base configured to hold the sensor; and
a waterproofing material made from a light curing resin and configured to cover connecting portions together with the sensor base, the connecting portions being between the terminal portions of the sensor and the connection conductors or the electric wires,
wherein the sensor base comprises a recessed portion configured to accommodate the connecting portions and filled with the waterproofing material, and
wherein a bottom wall of the recessed portion has a through hole facing the connecting portions.

2. The sensor assembly according to claim 1, wherein the door lock device comprises a cover configured to accommodate the latch and the ratchet, and wherein the sensor base is assembled to the cover.

3. The sensor assembly according to claim 1, wherein the connecting portions are resistance welded.

4. The sensor assembly according to claim 1, wherein the recessed portion is provided for each of the connecting portions.

5. The sensor assembly according to claim 1, wherein the waterproofing material is made up of an ultraviolet curing resin whose curing time is 3 seconds or longer to 20 seconds or shorter under a temperature of 25° C., an illuminance of 1000 mW/cm$^2$, and an accumulated light quantity of 3000 to 20000 mJ/cm$^2$.

6. A door lock device comprising:
a latch configured to engage with a striker provided on a vehicle body;
a ratchet configured to engage with the latch that is in engagement with the striker;
a drive mechanism configured to drive the ratchet to release an engagement of the ratchet with the latch;
a case accommodating the drive mechanism; and
a sensor assembly including a sensor configured to detect an operation of the latch or the ratchet,
wherein the sensor assembly comprises:
a connector configured to hold a plurality of connection conductors and assembled to the case, the connection conductors being connected directly or by way of a plurality of electric wires with a plurality of terminal portions of the sensor;
a sensor base configured to hold the sensor; and
a waterproofing material made from a light curing resin and configured to cover connecting portions together with the sensor base, the connecting portions being between the terminal portions of the sensor and the connection conductors or the electric wires,
wherein the sensor base comprises a recessed portion configured to accommodate the connecting portions and filled with the waterproofing material, and
wherein a bottom wall of the recessed portion has a through hole facing the connecting portions.

* * * * *